(12) United States Patent  (10) Patent No.: US 7,007,346 B2
Hoffman  (45) Date of Patent: Mar. 7, 2006

(54) MULTI-AXIS DOOR HINGE AND SWING-OUT VERTICAL-LIFT ASSEMBLY

(76) Inventor: Lawrence Andrew Hoffman, 877 SW. Summit View Dr., Portland, OR (US) 87225

(*) Notice: Subject to any disclaimer, the term of this patent is extended or adjusted under 35 U.S.C. 154(b) by 0 days.

(21) Appl. No.: 10/396,284

(22) Filed: Mar. 25, 2003

(65) Prior Publication Data

US 2004/0187263 A1  Sep. 30, 2004

(51) Int. Cl.
*E05D 3/10* (2006.01)
(52) U.S. Cl. .......................... 16/367; 16/366; 16/294; 49/257; 296/146.11; 296/146.12
(58) Field of Classification Search ................ 16/367, 16/366, 287, 294; 296/146.11, 146.12; 49/254
See application file for complete search history.

(56) References Cited

U.S. PATENT DOCUMENTS

| | | | |
|---|---|---|---|
| 1,069,505 A * | 8/1913 | Wheatley ..................... | 16/367 |
| 2,178,908 A * | 11/1939 | Hudson ........................ | 16/367 |
| D150,161 S | 7/1948 | Sanmori | |
| 2,754,537 A * | 7/1956 | Rose et al. .................... | 16/367 |
| 2,775,478 A | 12/1956 | Stimetz et al. | |
| 3,589,069 A * | 6/1971 | Lecomte ....................... | 49/257 |
| 3,594,859 A | 7/1971 | Slattery | |
| 3,628,216 A | 12/1971 | Saven et al. | |
| 3,870,381 A | 3/1975 | Kranse | |
| 4,513,475 A * | 4/1985 | Fenton ........................ | 16/360 |
| 4,684,167 A | 8/1987 | Newmayer | |
| 4,692,964 A | 9/1987 | DeBruyn | |
| 4,719,665 A | 1/1988 | Bell | |
| 4,776,626 A | 10/1988 | Seyler | |
| 4,801,172 A | 1/1989 | Townsend | |
| 5,035,463 A | 7/1991 | Kato et al. | |
| 5,074,609 A | 12/1991 | Dear | |
| 5,261,720 A | 11/1993 | Lomax, Jr. et al. | |
| 5,265,311 A | 11/1993 | Gard | |
| 5,600,868 A | 2/1997 | Tourville et al. | |
| 5,918,347 A | 7/1999 | Morawetz | |
| 6,000,747 A | 12/1999 | Sehgal et al. | |
| 6,086,137 A * | 7/2000 | Leschke et al. ........... | 296/146.1 |
| 6,175,991 B1 | 1/2001 | Driesman et al. | |

(Continued)

FOREIGN PATENT DOCUMENTS

DE        4319662 A1 * 12/1994

(Continued)

*Primary Examiner*—Brian E. Glessner
*Assistant Examiner*—Mark A. Williams
(74) *Attorney, Agent, or Firm*—Paul J. Fordenbacher, Esq.; Silicon Forest Patent Group

(57) ABSTRACT

A multi-axis automobile door mount providing a combination of swing-out and vertical-lift motion suitable for retrofitting a conventional swing-out automobile door for vertical-lift operation. The door is opened from a closed position in the conventional swing-out movement about a swing-out hinge. At a predetermined swing-out angle of the door to the automobile body, the door is moved in an upward vertical direction about the vertical-lift hinge. The door is closed by lowering the door to the horizontal orientation and closed in the conventional swing-in manner. A vertical-lift door system is provided to substantially incorporate the movement of a vertical-lift door with an integrated system of one or more hinges and lift assist devices. The lift assist devices provide for, singularly or in combination, among other things, controlled and deliberate movement of the door, power-assisted door operation, and/or easier integration and assembly onto the automobile.

31 Claims, 10 Drawing Sheets

U.S. PATENT DOCUMENTS

| | | |
|---|---|---|
| 6,178,593 B1 | 1/2001 | Carlson |
| 6,256,837 B1 * | 7/2001 | Lan et al. .................... 16/334 |
| 6,314,615 B1 * | 11/2001 | Wolda ......................... 16/367 |
| 6,447,043 B1 | 9/2002 | VandenHeuvel et al. |
| 6,629,377 B1 | 10/2003 | Taraschuk |
| 6,676,193 B1 * | 1/2004 | Hanagan ................ 293/146.11 |
| 6,808,223 B1 | 10/2004 | Baum |
| 6,845,547 B1 | 1/2005 | Ham |
| 2004/0244144 A1 | 12/2004 | Ham |
| 2005/0022342 A1 | 2/2005 | Ham |

FOREIGN PATENT DOCUMENTS

| | | |
|---|---|---|
| FR | 493225 A1 * | 7/1992 |
| JP | 402299926 A * | 12/1990 |

* cited by examiner

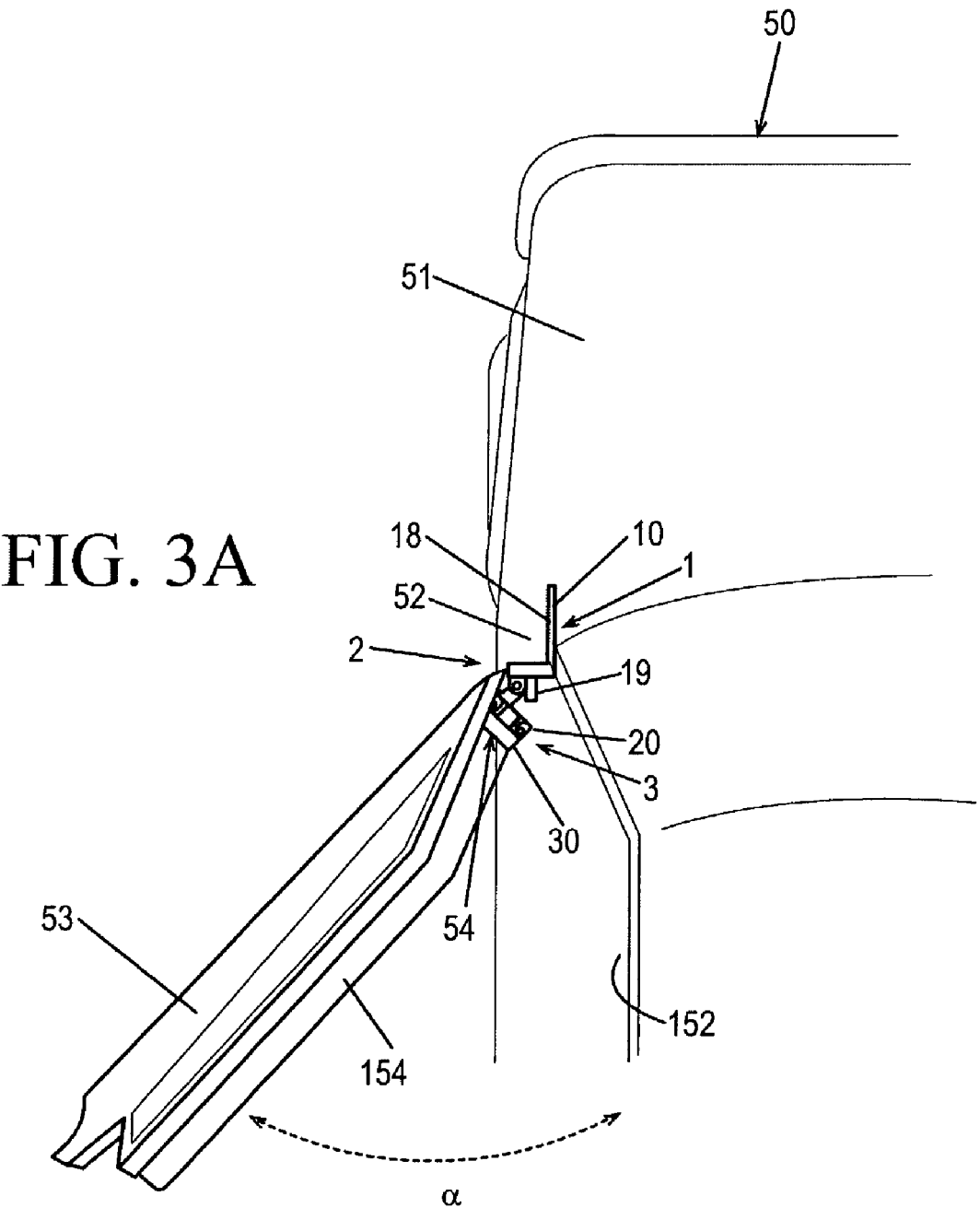

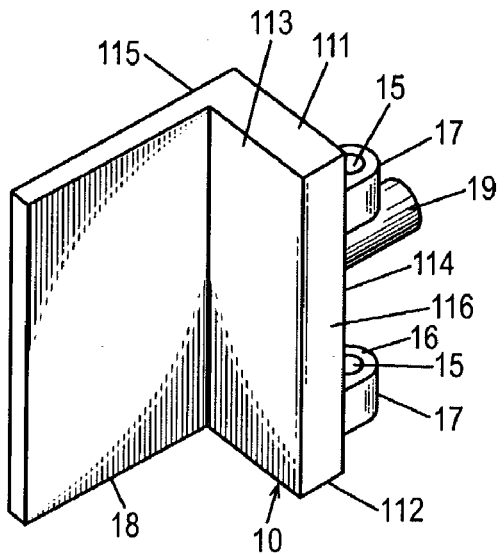
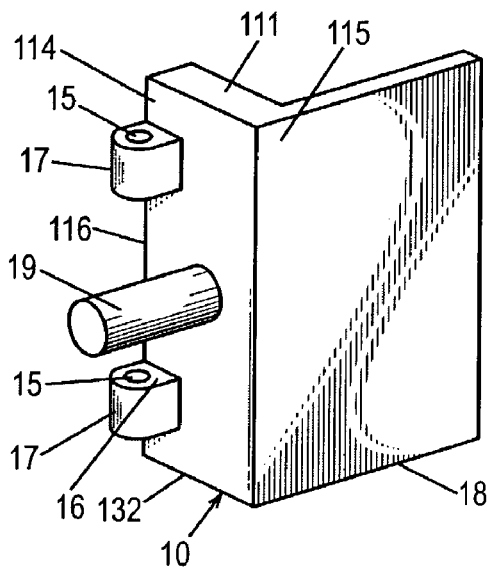
FIG. 4A    FIG. 4B
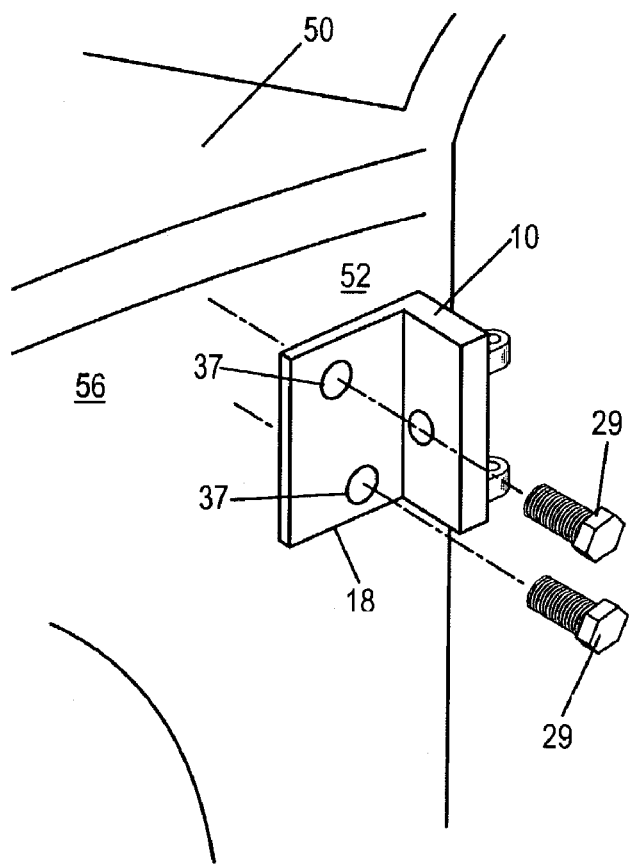
FIG. 4C

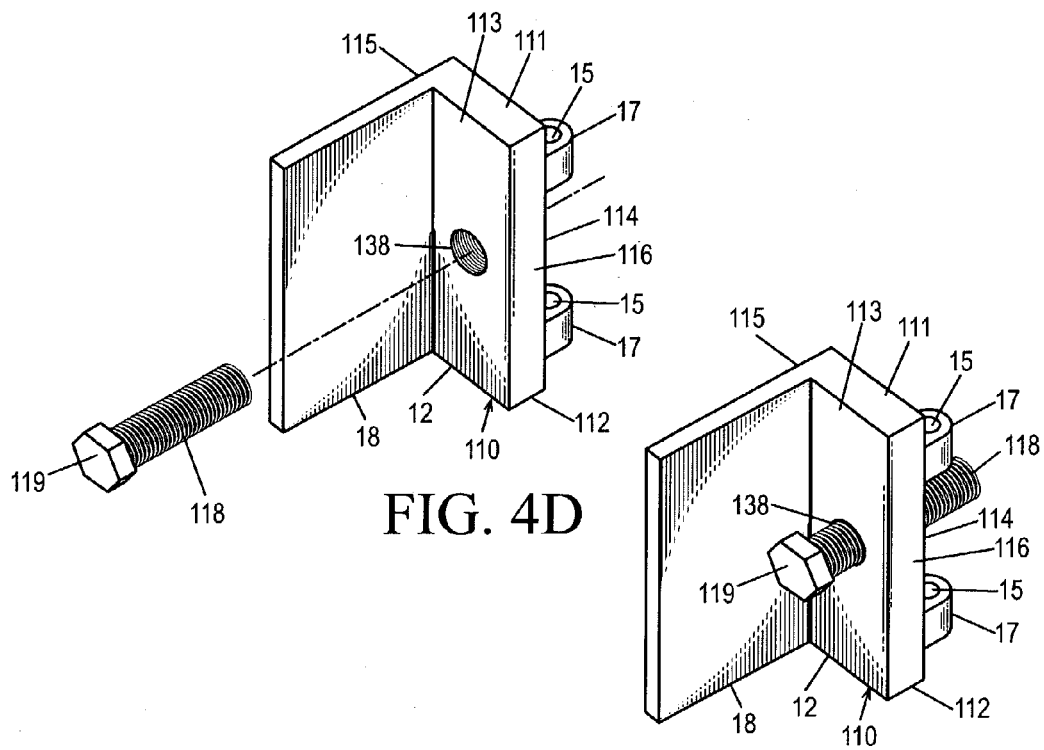
FIG. 4D
FIG. 4E
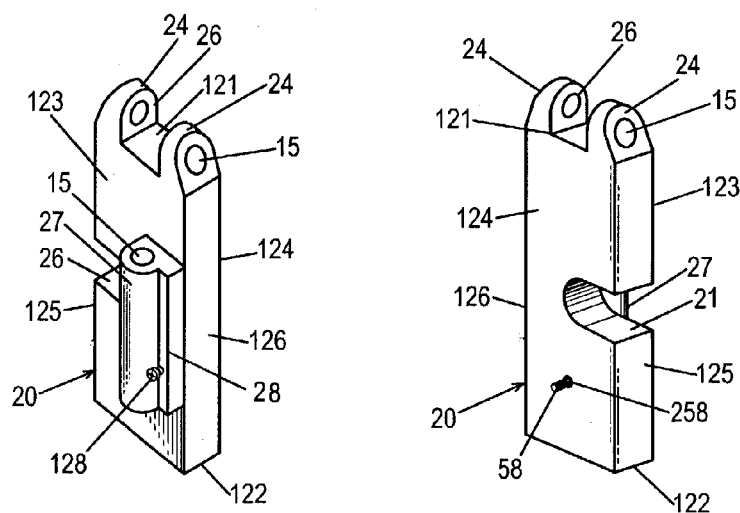
FIG. 5A
FIG. 5B

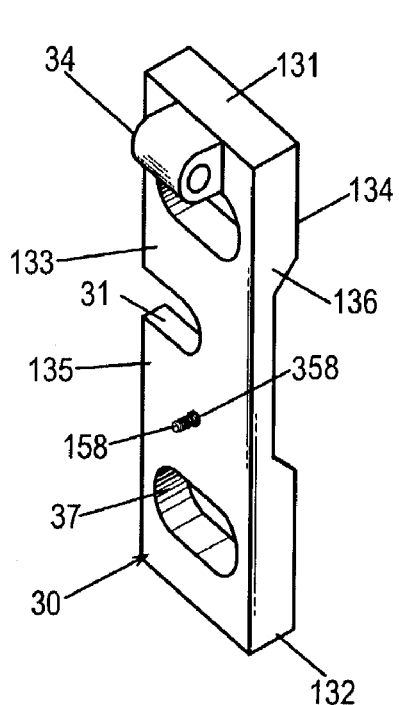 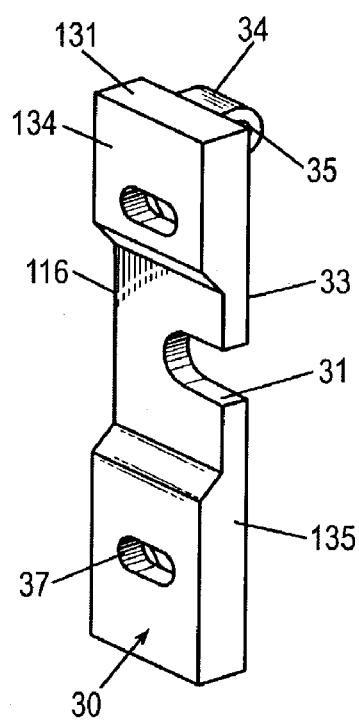
FIG. 6A    FIG. 6B
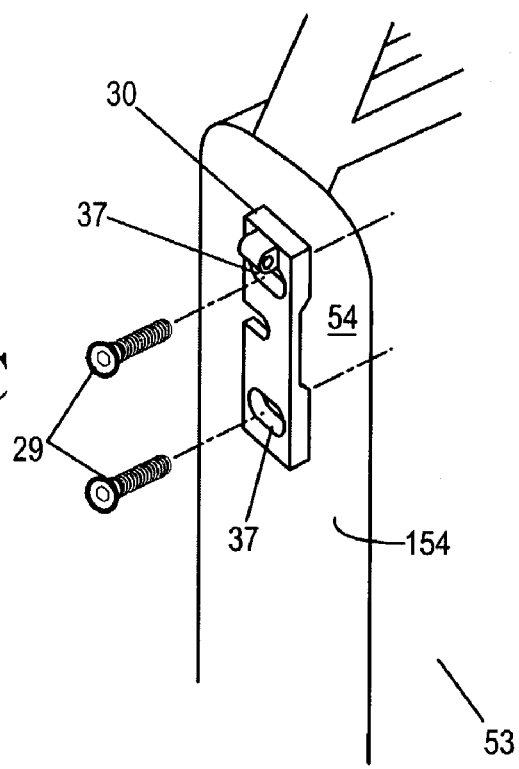
FIG. 6C

MULTI-AXIS DOOR HINGE AND SWING-OUT VERTICAL-LIFT ASSEMBLY

FIELD OF THE INVENTION

This invention relates to automobile doors that open vertically upward, and more particularly, to multi-axis door hinge components and swing-out vertical-lift door assemblies with independent function characteristics.

BACKGROUND OF INVENTION

One aspect of the automobile that has changed little is the swing-out door. The swing-out door is suspended from the automobile body using conventional single-axis hinges. Each single-axis hinge comprises two leaves; a stationary leaf that is usually mounted on a forward portion of a doorjamb, and a hinge leaf that is usually mounted on a forward portion of a door edge. Each leaf comprises one or more knuckles which have coaxial through bores. The knuckles of two leaves are interleaved such that the through bores are placed in coaxial alignment. The leaves are rotatably joined together with a hinge pin extending through the bores.

The conventional single-axis hinge permits rotation within one plane. As the door is opened, the rear door edge swings out from the side of the automobile in a substantially horizontal plane, whereby a space for stepping-in and stepping-out is formed between the rear door edge and the automobile body. A major issue with swing-out doors is the situation of tight parking spaces with little room for the door to swing open to allow ingress and egress. Also, the potential for damage to an adjacent automobile is a persistent problem resulting in the inevitable door ding.

Other door opening configurations have been tried, such as sliding, gull wing, and vertical-lift doors. Sliding doors are popular on vans, but not automobiles. The single-axis hinges of the gull wing door are mounted along the upper door edge, the door forming a portion of the roof, and permits rotation of the door above the automobile; a design made famous by DeLorian Motor Company. The single-axis hinge of the vertical-lift door, which is also known as the lambo, scissors, or jack-knife door, is mounted in the forward upper door corner which permits door rotation substantially within a vertical plane defined by the door; a design made famous by Lamborghini.

The advantages of the vertical-lift door are both functional and aesthetic. Since the rotation of the door is upward and not sideways as with the common swing-out door, ingress and egress is greatly facilitated in closely-spaced parking situations. The vertical-lift door eliminates the potential of banging the door against an object located to the side of the automobile. The vertical-lift door also adds a sense of style and luxury to the automobile.

For the most part, vertical-lift doors have been available only on expensive luxury performance automobiles and automobiles assembled from a kit by the consumer. These vehicles have door and door jam configurations, single-axis hinges, and latching mechanisms specifically designed into the automobile to permit the door to open vertically.

Many automobile enthusiasts consider it highly desirable to incorporate exotic features into their ordinary stock automobiles. The vertical-lift door is one such feature that has for the most part been out of reach of the aftermarket enthusiast. Retrofitting the conventional door to operate as a vertical-lift door is difficult to impossible due in part to door and automobile body style. Many automobile body styles incorporate doors with contoured surfaces that would collide with the automobile body if opened as a vertical-lift door.

In some automobile body styles, the bottom edge of the door undercuts the automobile body and therefore would prevent vertical rotation of the door. Other automobile body styles incorporate roof structures that overhang the top edge of the door, precluding vertical rotation of the door.

These and other issues hinder the availability of aftermarket components that would permit the automobile enthusiast to retrofit the conventional swing-out door to operate as a vertical-lift door. These issues also hinder the automobile manufacturers from incorporating vertical-lift doors in automobiles without requiring major redesign of the current automobile body styles which may or may not be aesthetically pleasing to the customer.

It would, therefore, be highly desirable to have components and assemblies that would provide automobile manufacturers and aftermarket enthusiasts the ability to incorporate the motion of the vertical-lift door in currently designed automobiles without major modification to the automobile body or door structures.

BRIEF DESCRIPTION OF DRAWINGS

FIGS. 3A and 3B are top and front perspective views, respectively, of an application of the multi-axis automobile door mount as used to provide a door of an automobile with vertical-lift operation, in accordance with an embodiment of the present invention;

FIGS. 4A and 4B are front and rear perspective views of a first leaf, in accordance with an embodiment of the present invention;

FIG. 4C is a perspective view of the first leaf coupled to the hinge mount body surface, in accordance with an embodiment of the present invention;

FIGS. 4D and 4E are front and rear perspective views of an embodiment of a first leaf with an adjustable lift hinge locking means in the form of a lift hinge locking bolt, in accordance with the present invention FIGS. 5A and 5B are front and rear perspective views of a second leaf, in accordance with an embodiment of the present invention;

FIGS. 6A and 6B are front and rear perspective views of a third leaf, in accordance with an embodiment of the present invention;

FIG. 6C is a perspective view of the third leaf coupled to the door, in accordance with an embodiment of the present invention

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

In the following detailed description, various terms are used to define various elements of a hinge. Other terms are used in the art to reference the same hinge element. Therefore, it is understood that the present invention is not to be limited by the use of a particular term used in reference to a particular hinge element. The following terminology is used throughout the description: a conventional hinge comprises two leaves, namely a stationary leaf and a hinge leaf, which pivot on a single axis of rotation; a leaf consists generally of a mounting portion, such as, but not limited to, a mounting plate, and one or more knuckles; a knuckle comprises an element, generally circular, having a bore adapted to accept a hinge pin, the knuckle extending from a mounting portion of a leaf; a notch is a space between two adjacent knuckles on one leaf into which a knuckle from a second leaf is positioned and interleaved; a stationary leaf is the leaf which is attached to a non-moving structure, such as a door frame; a hinge leaf is a leaf which is attached to a door; and a hinge pin is generally a rod adapted to pass through the bore of the interleaved knuckles of two leaves to join the leaves together.

In accordance with the present invention, embodiments of multi-axis automobile door mounts are provided that are adapted to facilitate pivotal motion of an automobile door about a substantially vertical axis of rotation for swing-out rotation as well as to facilitate pivotal motion of an automobile door about a substantially horizontal axis of rotation for vertical-lift rotation. In accordance with other aspects of the present invention, embodiments of multi-axis automobile door mount systems are provided that are adapted to facilitate pivotal motion of an automobile door about a substantially vertical axis of rotation for swing-out rotation as well as to facilitate pivotal motion of an automobile door about a substantially horizontal axis of rotation for vertical-lift rotation are provided, in addition to providing assistance with the operation of the automobile door.

Figure 1A:
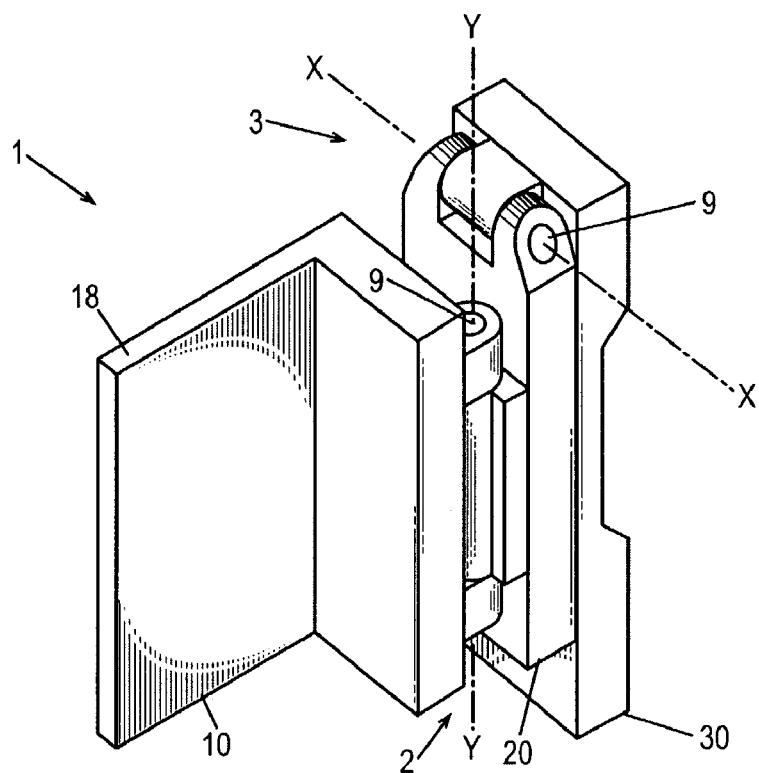
FIGS. 1A–1C are front, rear and exploded perspective views of a multi-axis automobile door mount, in accordance with an embodiment of the present invention.
Figure 1B:
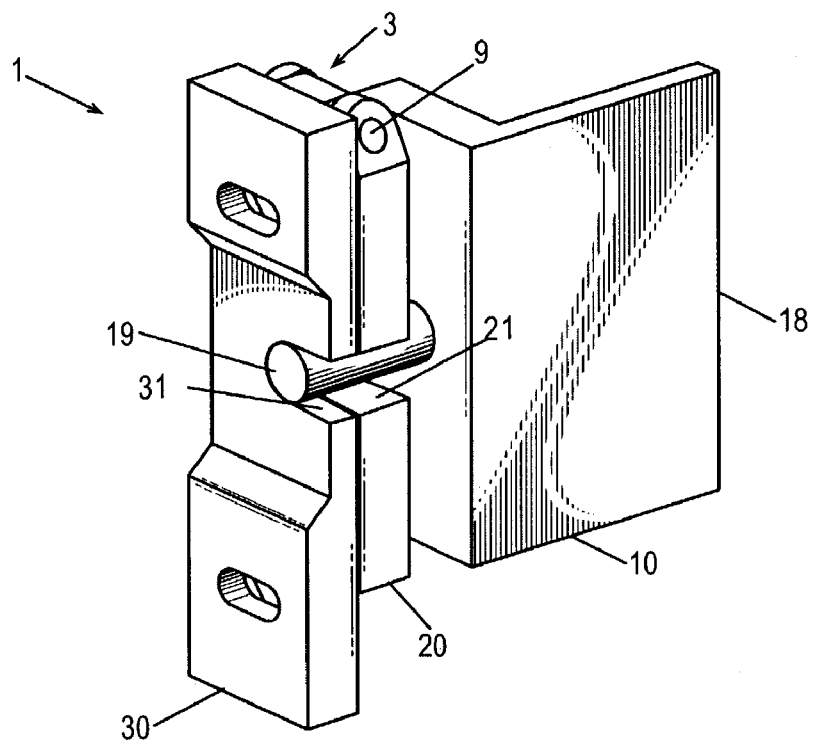
Figure 1C:
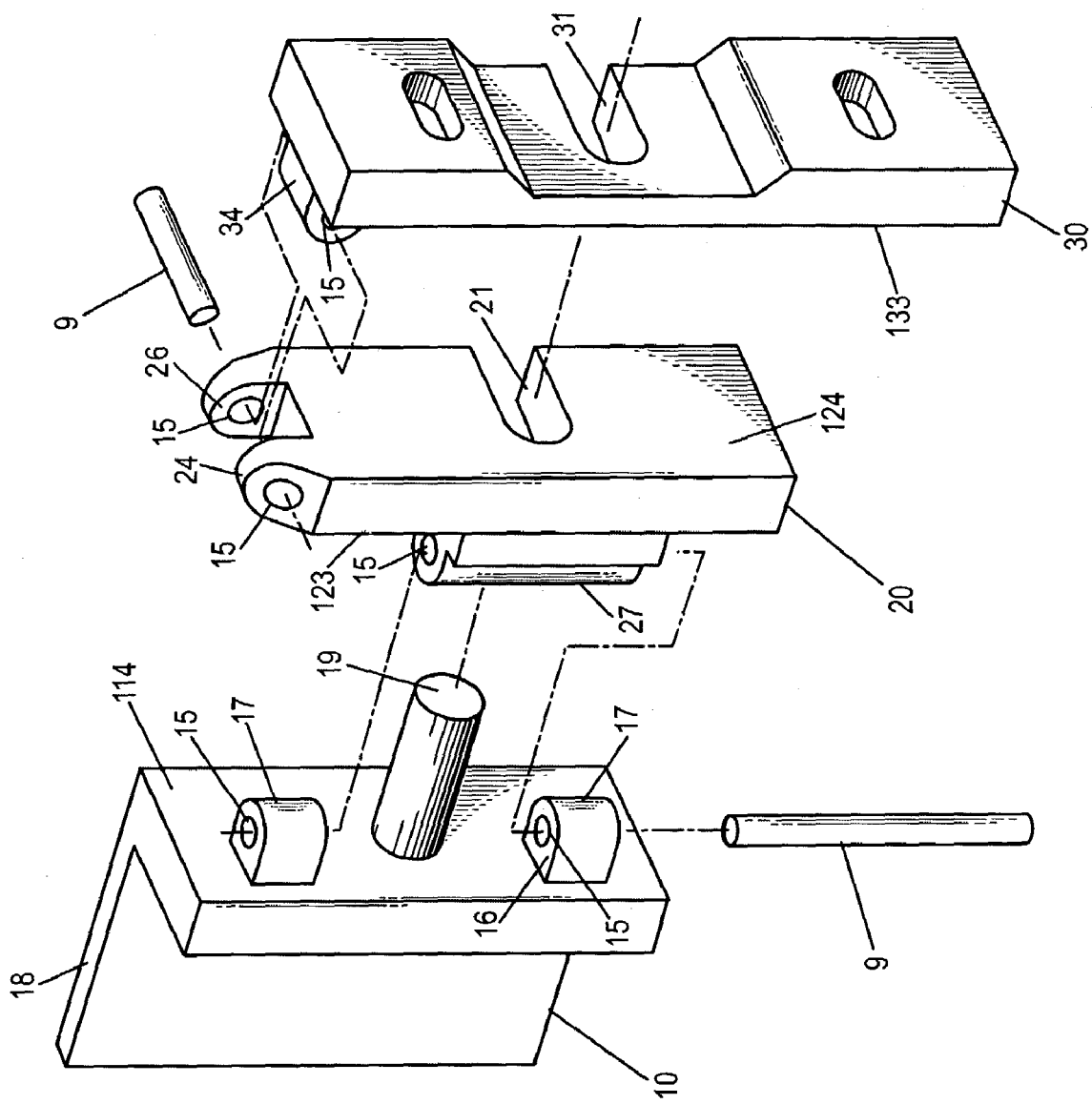
Figure 2A:
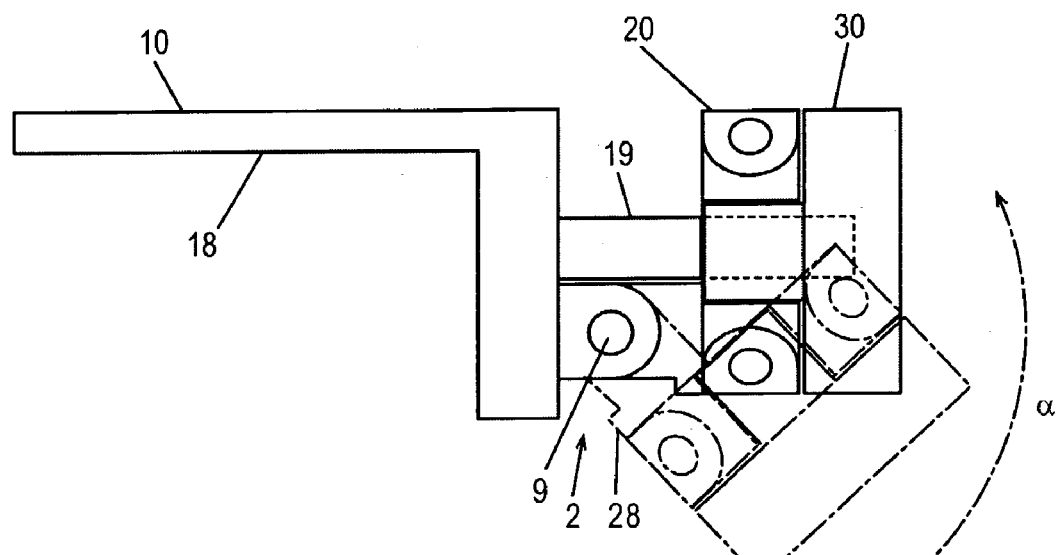
FIG. 2A is a top view of the multi-axis automobile door mount, in accordance with the embodiment of FIGS. 1A–1C, illustrating a first leaf and a second leaf joined together with a hinge pin to form a swing-out hinge that allows pivotal movement in the horizontal direction.
Figure 2B:
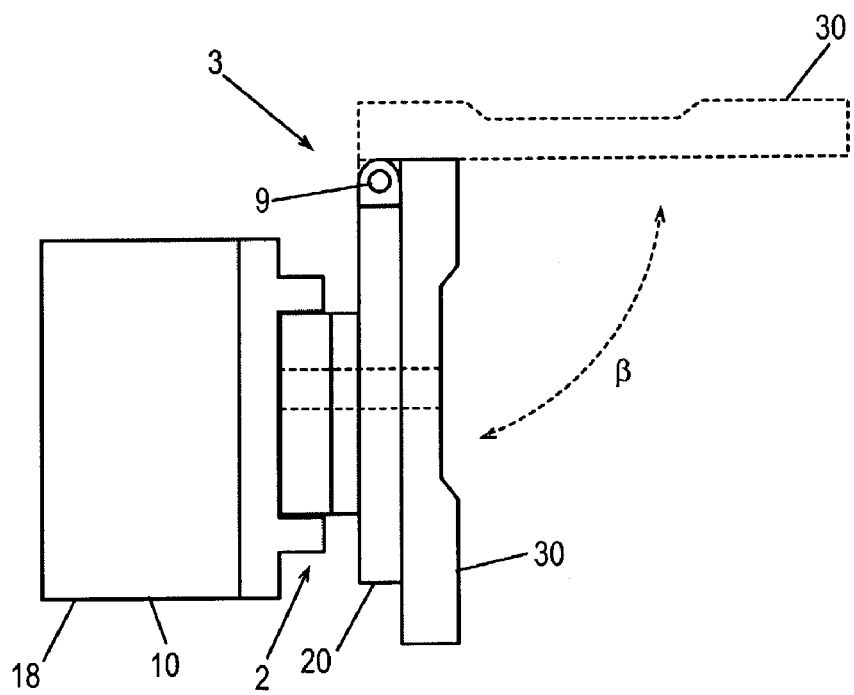
FIG. 2B is a side view of the multi-axis automobile door mount 1, in accordance with the embodiment of FIGS. 1A–1C, illustrating a second leaf and a third leaf joined together with a hinge pin to form a vertical-lift hinge that allows pivotal movement in the vertical direction.

FIGS. 1A–1C are front, rear and exploded perspective views of a multi-axis automobile door mount 1, in accordance with an embodiment of the present invention. The multi-axis automobile door mount 1 comprises a first leaf 10, a second leaf 20, and a third leaf 30. FIG. 2A is a top view of the multi-axis automobile door mount 1 illustrating the first leaf 10 and the second leaf 20 joined together with a hinge pin 9 defining a swing-out hinge 2 that provides rotation in a substantially horizontal plane about a vertical axis of rotation. FIG. 2B is a side view of the multi-axis automobile door mount 1 illustrating the second leaf 20 and the third leaf 30 joined together with a hinge pin 9 defining a vertical-lift hinge 3 that provides rotation in a substantially vertical plane about a horizontal axis of rotation. The multi-axis automobile door mount 1, therefore, provides rotation in a substantially horizontal plane and rotation in a substantially vertical plane, separately, and in combination, to suit a particular purpose.

Figure 3B:
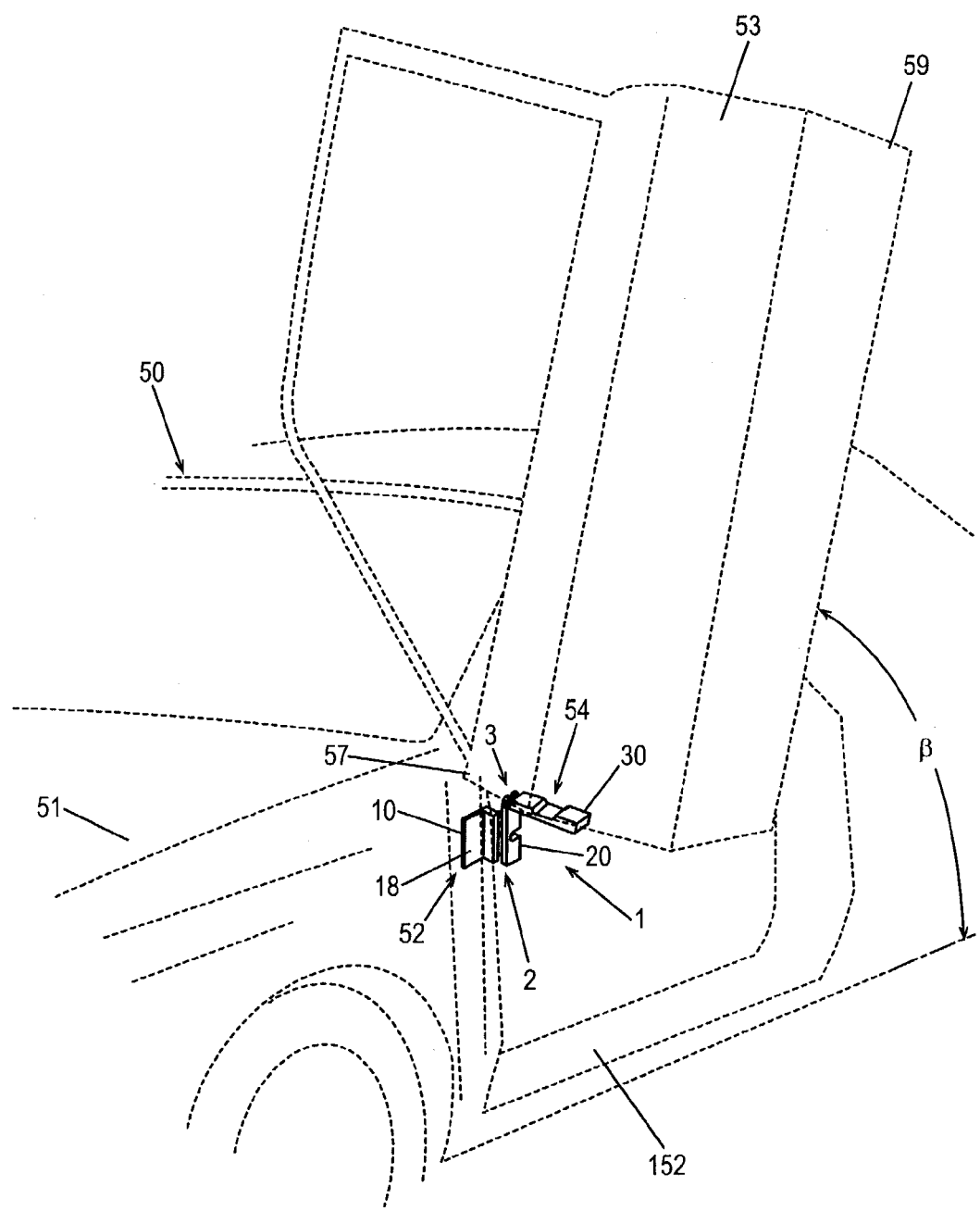

FIGS. 3A and 3B are top and front perspective views, respectively, of an application of the multi-axis automobile door mount 1 as used to provide a door 53 of an automobile 50 with swing-out and vertical-lift operational characteristics, in accordance with an embodiment of the present invention. FIG. 3A is a view from above the automobile 50 showing the left door 53 in a swung-out open position. FIG. 3B is a view from the front left corner of the automobile 50 showing the door 53 in a swung-out vertically lifted open position. The multi-axis automobile door mount 1, in accordance with embodiments of the invention, is useful for passenger automobiles for the front doors as well as for the rear doors (not shown).

In the embodiment of FIGS. 3A–3B, the first leaf 10 is coupled to a hinge mount body surface 52 of a doorjamb 152. The first leaf 10, therefore, is adapted to function as a stationary leaf. The third leaf 30 is coupled to a hinge mount door surface 54 of a door edge 154 to function as a hinge leaf. The second leaf 20 is pivotally coupled about a vertical axis of rotation to the first leaf 10, and pivotally coupled about a horizontal axis of rotation to the third leaf 30 which provides rotation of the door 53 within a substantially horizontal and substantially vertical plane, respectively.

It is contemplated that a wide variety of locations may be used as the hinge mount body surface 52 and the hinge mount door surface 54 as being suitable for a particular purpose. For example, but not limited thereto, the hinge mount door surface 54 is a forward door inner surface. In another embodiment, providing pivoting motion from the rear of the door 53, the hinge mount body surface 52 is a rear portion of the doorjamb 152 and the hinge mount door surface 54 is a rear door edge, providing door opening from the front of the door 53 rather than from the rear.

In yet another embodiment in accordance with the present invention, the hinge mount body surface 52 is that surface vacated by the removal of a stock swing hinge stationary leaf, and the hinge mount door surface 54 is that surface vacated by the removal of the stock swing hinge hinge leaf. This embodiment provides for one for one replacement of the single-axis stock hinge with the multi-axis automobile door mount 1.

The multi-axis automobile door mount 1, as will be discussed below, provides a combination of swing-out and vertical-lift motion necessary for, among other things, the retrofitting of a conventional single-axis swing-out automobile door for swing-out vertical-lift operation. In one embodiment in accordance with the present invention, the door 53 is adapted to open from a closed position in the conventional swing-out rotation about the swing-out hinge 2 within a substantially horizontal plane. At a predetermined angle α of the door 53 to the automobile body 51, the door 53 is adapted to rotate upward about the vertical-lift hinge 3 within a substantially vertical plane to a predetermined lift angle β. The door 53 is adapted to close by lowering the door 53 to the substantially horizontal orientation and swung-in in the conventional manner.

Referring again to FIGS. 1A–1C, the multi-axis automobile door mount 1 comprises a first leaf 10, a second leaf 20, and a third leaf 30. Each leaf is discussed in turn below. FIGS. 4A and 4B are front and rear perspective views of the first leaf 10, in accordance with an embodiment of the present invention. The first leaf 10 comprises a first leaf first end 111, a first leaf second end 112, a first leaf first side 113, a first leaf second side 114, a first leaf first edge 115, and a first leaf second edge 116. Extending from the first leaf second side 114 adjacent the first leaf second edge 116 are two spaced apart first swing knuckles 17 defining a swing notch 16 there between. The first swing knuckles 17 have a generally cylindrical shape each with a bore 15 there through. The axis of the bores 15 are in substantially coaxial alignment and extend substantially parallel to the first leaf second edge 116. The swing notch 16 is adapted to accept a second swing knuckle 27 of the second leaf 20, as will be discussed below.

In one application of the multi-axis automobile door mount 1 as shown in FIGS. 3A and 3B, in accordance with the present invention, the first leaf 10 is the stationary leaf coupled to the hinge mount body surface 52 of the doorjamb 152 of the automobile 50. The hinge mount body surface 52 takes many forms particular to the model of automobile 50, and therefore, the first leaf 10 is adapted to facilitate coupling to a specific hinge mount body surface 52 particular to the automobile 50.

In one embodiment in accordance with the present invention, the first leaf 10 further comprises a coupling portion 18, extending a predetermined distance from the first leaf first side 113 adjacent the first leaf first edge 115. The coupling portion 18 is adapted to be coupled to a structure, such as but not limited to, the hinge mount body surface 52 of the doorjamb 152 of the automobile 50. The coupling portion 18 is coupled to the hinge mount body surface 52 using any number of appropriate coupling means known in the art, including, but not limited to, welding, brazing, and mechanical fastening.

In one embodiment in accordance with the present invention, the coupling portion 18 is adapted to facilitate the provision of a plurality of bolt holes (not shown), such as, but not limited to, those made by the consumer or assembler using a drill, in predetermined locations that correspond to a bolt pattern provided in the hinge mount body surface 52 of the doorjamb 152 of a specific automobile 50 after the removal of the conventional stock hinge.

FIG. 4C is a front perspective view of the first leaf 10, in accordance with an embodiment of the present invention. The coupling portion 18 is provided with a plurality of bolt holes 37, such as, but not limited to, those made by the consumer or assembler using a drill, in predetermined locations that correspond to the stock bolt hole pattern or a new bolt hole pattern provided in the hinge mount body surface 52 of the doorjamb 152 made by the consumer or assembler. One or more bolts 29 couple the first leaf 10 to the automobile 50.

In another embodiment in accordance with the present invention, the coupling portion 18 is provided with a plurality of bolt holes (not shown) in predetermined locations that correspond to a bolt pattern provided in a hinge mount body surface 52 of the doorjamb 152 of one or more specific model of automobile 50 after the removal of the conventional stock hinge, negating the need for the consumer or assembler to provide the bolt hole pattern in the multi-axis automobile door mount 1.

In yet another embodiment in accordance with the present invention, the coupling portion 18 is provided with a plurality of elongated bolt holes (not shown, but similar to those shown in FIG. 6A) in predetermined locations that correspond to one or more bolt patterns provided in the hinge mount body surface 52 of the doorjamb 152 of one or more specific model of automobile 50 after the removal of the conventional stock hinge. The elongated bolt holes allow for, among other things, accommodation of mal-aligned bolt hole patterns and applicability across a plurality of models of automobile.

The specific configuration of the first leaf 10 to permit coupling to an automobile surface is dependent on a specific automobile under consideration. Therefore, it is understood that other leaf configurations are anticipated that are adapted to couple to an automobile's particular body and/or door surface while retaining the mechanical function of a multi-axis automobile door mount, as provided herein.

FIGS. 5A and 5B are front and rear perspective views of the second leaf 20, in accordance with an embodiment of the present invention. The second leaf 20 comprises a second leaf first end 121, a second leaf second end 122, a second leaf first side 123, a second leaf second side 124, a second leaf first edge 125, and a second leaf second edge 126. A second swing knuckle 27 extends from the second leaf first side 123 and adjacent to the second leaf second edge 126. The second swing knuckle 27 has a generally cylindrical shape with a bore 15 there through. The axis of the bore 15 extends substantially parallel with the second leaf second edge 126. The second swing knuckle 27 of the second leaf 20 is adapted to be interleaved within the swing notch 16 of the first leaf 10 with the axis of the bores 15 is substantially coaxial alignment, as discussed below.

Two spaced-apart first lift knuckles 24 extend from the second leaf first end 121 defining a lift notch 26 there between. The first lift knuckles 24 have a generally cylindrical shape, each with a bore 15 there through. The bores 15 are substantially coaxial and extend substantially parallel to the second leaf first end 121. The lift notch 26 is adapted to accept a second lift knuckle 34 of the third leaf 30, as discussed below.

FIG. 6A and 6B are front and rear perspective views, respectively, of the third leaf 30, in accordance with an embodiment of the present invention. The third leaf 30 comprises a third leaf first end 131, a third leaf second end 132, a third leaf first side 133, a third leaf second side 134, a third leaf first edge 135, and a third leaf second edge 136. A second lift knuckle 34 extends from the third leaf first side 133 adjacent the third leaf first end 131. The second lift knuckle 34 has a generally cylindrical shape with a bore 15 there through. The bore 15 extends substantially parallel with the third leaf first end 131. The second lift knuckle 34 is adapted to be coaxially positioned or interleaved within the lift notch 26 of the second leaf 20, as discussed below.

The third leaf 30 is coupled to the hinge mount door surface 54 of the door edge 154 using any number of appropriate coupling means known in the art, including, but not limited to, welding, brazing, and mechanical fastening. FIG. 6C is a perspective view of an embodiment of the third leaf 30 coupled to the door 53, in accordance with the present invention. The third leaf 30 is provided with a plurality of bolt holes 37 in predetermined locations that correspond to a bolt pattern provided in a hinge mount door surface 54 of the door edge 154 of one or more specific model of automobile after the removal of the conventional stock hinge. The third leaf 30 is coupled to the hinge mount door surface 54 with one or more bolts 29.

In another embodiment in accordance with the present invention, the third leaf 30 is adapted to be provided with a plurality of bolt holes (not shown), such as, but not limited to, those made by the consumer or assembler using a drill, in predetermined locations that correspond to a bolt pattern provided in the hinge mount door surface 54 of the door edge 154 of a specific automobile 50 after the removal of the conventional stock hinge.

In another embodiment in accordance with the present invention, the third leaf 30 is adapted to be provided with a plurality of bolt holes (not shown), such as, but not limited to, those made by the consumer or assembler using a drill, in predetermined locations that correspond to a new bolt hole pattern provided in the hinge mount door surface 54 of the door edge 154.

In yet another embodiment in accordance with the present invention, the third leaf 30 is provided with a plurality of elongated bolt holes 37 in predetermined locations that correspond to one or more bolt patterns such as those provided in the hinge mount door surface 54 of the door edge 154 across one or more specific model of automobile after the removal of the conventional stock hinge. The elongated bolt holes 37 allow, among other things, for accommodation of mal-aligned bolt hole patterns and applicability across a plurality of models of automobile 50.

In another embodiment in accordance with the present invention, the third leaf 30 is provided with a plurality of bolt holes (not shown) in predetermined locations that correspond to a bolt pattern provided in a hinge mount door surface 54 of one or more specific model of automobile 50 after the removal of the conventional stock hinge, negating the need for the consumer or assembler to provide the bolt hole pattern in the multi-axis automobile door mount 1.

As stated previously, the specific configuration of a first leaf 10 and/or a third leaf 30 to permit coupling to a hinge mount body surface 52 and/or hinge mount door surface 54, respectively, is dependent on the specific automobile under consideration. Therefore, it is understood that other leaf configurations are anticipated that are adapted to couple to an automobile's particular body and/or door surface while retaining the mechanical function of the multi-axis automobile door mount 1 as provided herein.

Referring again to FIGS. 1A–1C, in accordance with an embodiment of the present invention, the multi-axis automobile door mount 1 is assembled such that the first leaf second side 114 is adjacent the second leaf first side 123. The swing notch 16, defined by the two spaced apart first swing knuckles 17, is adapted to accept the second swing knuckle 27 of the second leaf 20 there between. The second swing knuckle 27 is interleaved with the two first swing knuckles 17 such that the bores 15 are substantially coaxial to form a substantially continuous bore adapted to slidably receive the hinge pin 9. A swing hinge 2 is defined herein as the first leaf 10 coupled with the second leaf 20 with the hinge pin 9. The swing hinge 2 is adapted to rotate about a substantially vertical axis and open to a predetermined swing angle α, as shown in FIG. 2A.

The multi-axis automobile door mount 1 is further assembled such that the second leaf second side 124 is adjacent the third leaf first side 133. The lift notch 26, defined by the two spaced apart first lift knuckles 24, is adapted to accept the second lift knuckle 34 of the third leaf 30 there between. The second lift knuckle 34 is interleaved with the two first lift knuckles 24 such that the bores 15 are substantially coaxial to form a substantially continuous bore adapted to slidably receive the hinge pin 9. A vertical-lift hinge 3 is defined herein as the second leaf 20 coupled with the third leaf 30 with the hinge pin 9. The vertical-lift hinge 3 is adapted to rotate about a substantially horizontal axis and open to a predetermined lift angle β, as shown in FIG. 2B.

It is contemplated that a wide variety of embodiments may be used to accomplish the functionality of the multi-axis automobile door mount 1, only one of which having a swing hinge 2 and the vertical-lift hinge 3. The wide variety of pivoting mechanisms used in the art for conventional single-axis hinges may be incorporated into the multi-axis automobile door mount 1. For example, but not limited thereto, it is appreciated that the multi-axis automobile door mount 1 will operate in substantially the same manner where the arrangement of the knuckles and notches are transposed on respective leaves. For example, the first lift knuckles 24 and the lift notch 26 of the second leaf 20 is replaced with a single lift knuckle, and the second lift knuckle 34 on the third leaf 30 is replaced with two knuckles and a notch. Also, it is appreciated that the number of knuckles and notches may vary without deviating from the basic operation and function of the multi-axis automobile door mount 1.

It is appreciated that the shape of the knuckles and notches may be varied while retaining the functionality provided by the multi-axis automobile door mount 1. For example, but not limited thereto, the knuckle is in the form of one or more extending flanges each having an aperture substantially coaxial with the other, each flange aperture being coaxial with and placed in sliding pivoting engagement with a corresponding flange aperture of a corresponding leaf.

Referring again to FIGS. 3A and 3B, the multi-axis automobile door mount 1 is used to couple the door 53 to the automobile body 51, in accordance with an embodiment of the present invention. The first leaf 10 is coupled to the hinge mount body surface 52 of a doorjamb 152 with the swing hinge 2 orientated away from the automobile body 51 to function as a stationary leaf. The third leaf 30 is coupled to the hinge mount door surface 54 of the door edge 154 with the vertical-lift hinge 3 in an upward orientation to function as a hinge leaf. The second leaf 20 is coupled to the first leaf 10 and the second leaf 30 to allow for swing-out and vertical-lift movement, respectively, as previously described.

It is understood that the specific location of the knuckles on their respective leaves will determine, among other things, the pivoting characteristics of the respective hinge. In the embodiment of the first leaf 10 as shown in FIGS. 4A and 4B, and as previously stated, the two spaced apart first swing knuckles 17 extend from the first leaf second side 114 adjacent the first leaf second edge 116. In another embodiment of the first leaf 10, in accordance with the present invention, the two spaced apart first swing knuckles 17 extend from the first leaf second side 114 a predetermined distance from the first leaf second edge 116. Correspondingly, the complementary second swing knuckle 27 of the second leaf 20 extends from the second leaf first side 123 a predetermined distance from the second leaf second edge 126. The axis of rotation, therefore, is positioned closer to the coupling portion 18 and therefore effects the way that the door 53 will swing out from the doorjamb 152. Therefore, the location of the knuckles, and therefore the axis of rotation, is determined to be that which is suitable for a particular purpose.

Referring again to FIG. 5A, the second swing knuckle 27 of the second leaf 20 extends from the second leaf first side 123 a predetermined distance from the second leaf second edge 126. The second leaf 20 further comprises a raised portion 28 of the second leaf first side 123 adjacent to the second swing knuckle 27 and the second leaf second edge 126. As shown in FIG. 2A, the maximum swing-out angle α will be determined by the abutment of the raised portion 28 against the first leaf 10. Therefore, the distance in which the raised portion 28 extends from the second leaf first side 123 determines the maximum swing-out angle α; a greater extension will reduce the maximum swing-out angle α. The distance in which the raised portion 28 extends from the second leaf first side 123 is determined to be that which is suitable for a particular purpose.

In other embodiments in accordance with the present invention, a maximum swing-out angle α adjustment means is provided. In one embodiment of a maximum swing-out angle α adjustment means comprises a set screw 128 provided in addition to or in lieu of the raised portion 28, as shown in FIG. 5A. The set screw 128 extends from the second leaf first side 123 adjacent to the second swing knuckle 27 and the second leaf second edge 126. The set screw 128 is adapted to be raised or lowered to provide a desired predetermined distance in which the set screw 128 extends from the second leaf first side 123 and therefore the maximum swing-out angle α in which the set screw 128 will come into abutment with the first leaf 10.

An important consideration, among others, in the retrofitting of conventional single-axis swing-out doors to operate with a vertical-lift operation is the assurance that the door 53 will not collide with the automobile body 51 when vertically lifted. In other embodiments of the multi-axis automobile door mount 1 in accordance with the present invention, a lift hinge locking means is provided to restrict the vertical motion of the vertical-lift hinge 3 until the swing-out hinge 2 has opened to a predetermined angle α, as shown in FIG. 2A.

FIGS. 1B, 1C, 2A, 2B, 3A, 4A and 4B illustrate a lift hinge locking means in the form of a lift hinge locking pin 19 and first and second lift hinge locking slots 21, 31, in accordance with an embodiment of the present invention. The first leaf 10 further comprises a lift hinge locking pin 19 and second and third leaves 20, 30 further comprise first and second lift hinge locking slots 21, 31, respectively, that, in cooperative engagement with the lift hinge locking pin 19, restrict the function of the vertical-lift features of the multi-axis automobile door mount 1. The lift hinge locking pin 19 is an elongated member, such as, but not limited to a generally cylindrical member, that extends a predetermined distance from the first leaf second side 114. The lift hinge locking pin 19 is adapted to be accepted by the first and second lift hinge locking slots 21, 31 of the second and third leaves 20, 30, respectively, as shown in FIG. 1B, and as discussed below.

The second leaf 20 further comprises a first lift hinge locking slot 21 and the third leaf 30 further comprises a second lift hinge locking slot 31. The first lift hinge locking slot 21 and the second lift hinge locking slot 31 extend a predetermined distance from the second leaf first edge 125 and the third leaf first edge 135, respectively, as shown in FIGS. 5B and 6B, respectively, and are substantially collocated to engage the lift hinge locking pin 19 therein.

The multi-axis automobile door mount 1, as positioned in a closed position, as shown in FIG. 1B, provides the lift hinge locking pin 19 to extend from the first leaf second side 114, through the first lift hinge locking slot 21 and further through the second lift hinge locking slot 31 in cooperative engagement. The lift hinge locking pin 19 moves out of engagement with the first and second lift hinge locking slots 21, 31 as the swing hinge 2 is pivoted to an open position to a predetermined angle α.

The vertical-lift hinge 3 is prevented from pivoting when the lift hinge locking pin 19 is engaged with the first and second lift hinge locking slots 21, 31. This feature provides that the vertical-lift hinge 3 is restricted from movement until the swing hinge 2 is positioned at a predetermined angle α wherein the lift hinge locking pin 19 disengages the first and second lift hinge locking slots 21, 31. As will be explained in detail below, this feature prevents the door 53 from rotating vertically until it is swung out to a predetermined angle α where the door 53 will clear the automobile body 51 when the door 51 is vertically lifted.

In operation, the door 53 is opened initially from a closed position in the conventional swing-out rotation. At a predetermined swing-out angle α, or greater, of the door 53 to the automobile body 51, as shown in FIG. 3A, the lift hinge locking pin 19 rotates clear of the first and second lift hinge locking slots 21, 31, permitting a vertical rotation of the door 53 in an upward direction about the vertical-lift hinge 3, to a predetermined angle β. The door 53 is initially closed by vertically rotating the door 53 down from a lifted position. The lift hinge locking pin 19 is adapted to prevent the downward rotation of the door 53 unless the door 53 is at, or greater than, the predetermined swing-out angle α. The door 53 is lowered to a substantially horizontal position where the lift hinge locking pin 19 is aligned to engage the first and second lift hinge locking slots 21, 31 as the vertical-lift hinge 3 is fully closed. The door 53 is subsequently closed in the conventional swing-in manner, with the lift hinge locking pin 19 coming into engagement with the first and second lift hinge locking slots 21, 31.

The length of the lift hinge locking pin 19 extending from the first leaf second side 114 determines, among other things, the minimum swing-out angle α where the lift hinge locking pin 19 disengages with the first and second lift hinge locking slots 21, 31. A longer lift hinge locking pin 19 will engage the first and second lift hinge locking slots 21, 31 over a greater swing-out angle α than would be provided by a shorter lift hinge locking pin 19.

The multi-axis automobile door mount 1 provides an initial swing-out prior to enabling vertical-lift of the door 53 providing a number of advantages. These advantages include, but are not limited to, retaining the conventional swing-out operating characteristics associated with the initial opening and final closing movement of the door, and enabling the ability to accommodate many door shapes for vertical-lift operation. Retaining the initial swing-out of the door provides that no modification to the stock latching and closing mechanism is required. Further, the integrity of the stock door sealing and weather stripping system is not compromised.

The initial swing-out of the door 53 also provides that all door structures will clear the automobile body 51 as the door 53 is vertically-lifted. This permits the incorporation of vertical door operation for automobiles with doors that have structures that would collide with the automobile body 51 if the door 53 were to be opened using a single-axis vertical-lift hinge. Such door structures include, but are not limited to, an undercut bottom door edge that wraps inwardly under the automobile body 51 that would collide with the doorjamb 152.

Another important consideration, among others, in the retrofitting of conventional swing-out doors with swing-out vertical-lift operation is to provide the ability to adjust or fine tune the operation and alignment of the multi-axis automobile door mount 1. Adjustment and alignment considerations can take many forms, including, but not limited to: strategic placement of the multi-axis automobile door mount 1 for proper alt-azimuth location of the vertical and horizontal pivot axis location; means for accommodating misaligned bolt holes; means for adjusting minimum swing-out opening angle α until disengagement of the vertical pivot locking pin with the lift hinge locking slots; means for adjusting maximum swing-out opening angle α, and means for adjusting door alignment with the doorjamb.

Referring again to FIGS. 3A and 3B, the door vertical pivot point is determined, in part, by the vertical distance of the multi-axis automobile door mount 1 within the doorjamb 152. The higher the multi-axis automobile door mount 1 is mounted within the doorjamb 152, the higher the resulting vertical and horizontal pivot axis location. A higher pivot axis location may be required wherein a portion of the door 53 above the multi-axis automobile door mount 1 would otherwise collide with the automobile body 51 when in vertical-lift position, such as, but not limited to, upper door corner 57.

In one embodiment in accordance with the present invention, means for accommodating misaligned bolt holes between the bolt holes of the first leaf 10 and the hinge mount body surface 52, and the bolt holes 37 of the third leaf 30 and the hinge mount door surface 54, is provided. As discussed previously, in one embodiment in accordance with the present invention, the bolt holes 37 in the first leaf 10 and/or the third leaf 30 are elongated to facilitate alignment with misaligned bolt holes 37 in the hinge mount body surface 52 and/or hinge mount door surface 54, respectively, as shown in FIG. 6A. In another embodiment in accordance with the present invention, the elongated bolt holes 37 further provide the ability to adjust and align the angular position of the multi-axis automobile door mount 1 with respect to global horizontal and vertical axes.

In one embodiment in accordance with the present invention, means for adjusting the minimum swing-out angle α at which point the vertical-lift hinge 3 is free to rotate, as shown in FIG. 2A is provided. One embodiment in accordance with the present invention of a means for adjusting the minimum swing-out angle α, means for providing a length-adjustable lift hinge locking means is provided.

FIGS. 4D and 4E are front and rear perspective views of an embodiment of a first leaf 110 with an adjustable lift hinge locking means in the form of a lift hinge locking bolt 119, in accordance with the present invention. The first leaf 110 is substantially similar to the first leaf 10 as shown in FIGS. 4A and 4B. The first leaf 110 further comprises a threaded through hole 138 extending from the first leaf first side 113 through to the first leaf second side 114. The first leaf 110 further comprises the lift hinge locking bolt 119 adapted to threadably engage the threaded through hole 138. The lift hinge locking bolt 119 comprises a shaft 118 having a diameter adapted to move into cooperative engagement with the first and second lift hinge locking slots 21, 31.

The engagement of the lift hinge locking bolt 119 and the threaded through hole 138 permits the user to adjust the extent from which the lift hinge locking bolt 119 projects from the first hinge second surface 114. The length of the lift hinge locking bolt 119 that extends from the first hinge second surface 114 determines, in part, to what minimum swing-out angle α that the lift hinge locking bolt 119 disengages with the first and second lift hinge locking slots 21, 31. A longer extension of the lift hinge locking bolt 119 engages the first and second lift hinge locking slots 21, 31 over a greater swing-out angle α than would be provided by a shorter extension of the lift hinge locking bolt 119.

In one embodiment in accordance with the present invention, means for adjusting the alignment of the door 53 with respect to the doorjamb 152 is provided by a means for setting the degree of angular rotation of the door 53 with respect to the doorjamb 152. FIG. 5B illustrates an embodiment of a means for adjusting the alignment of the door 53 comprising a vertical set screw 58 in accordance with the present invention. The vertical set screw 58 threadably extends from the second leaf second side 124 a distance that is adjustable by the turning of the set screw 58 within a threaded bore 258. The vertical set screw 58 abuts the third leaf first side 135 when the vertical lift hinge 3 is in the closed or down position. In another embodiment in accordance with the present invention, as shown in FIG. 6A, a vertical set screw 158 threadably extends from a threaded bore 358 extending into the third leaf first side 133 to abut the second leaf second side 124 in similar function as provided above.

The vertical set screw 58, 158 is provided to adjust the angular position of the lift hinge 3 when in the closed or down position. The angular position of the lift hinge 3 in the closed position will determine, in part, the alignment of the door 53 with respect to the doorjamb 152. Extension of the vertical set screw 58, 158 is adapted to provide adjustment of the position of a distal door edge 59 in an upward direction with respect to the doorjamb 152, as shown in FIG. 3B.

In accordance with other aspects of the present invention, embodiments of multi-axis automobile door mount systems are provided that are adapted to facilitate pivotal motion of an automobile door about a substantially vertical axis of rotation for swing-out rotation as well as to facilitate pivotal motion of an automobile door about a substantially horizontal axis of rotation for vertical-lift rotation are provided, in addition to providing assistance with the operation of the automobile door.

Embodiments of a vertical-lift door system provide the assembler or consumer an integrated system of one or more hinges and lift assist devices to facilitate the operating characteristics of a swing-out vertical-lift door. The lift assist devices provide for, singularly or in combination, among other things, controlled and deliberate movement of the door, power-assisted door operation, and easier integration and assembly onto automobiles during new automobile assembly as well as stock automobiles for retrofit after-market applications.

Figure 7A:
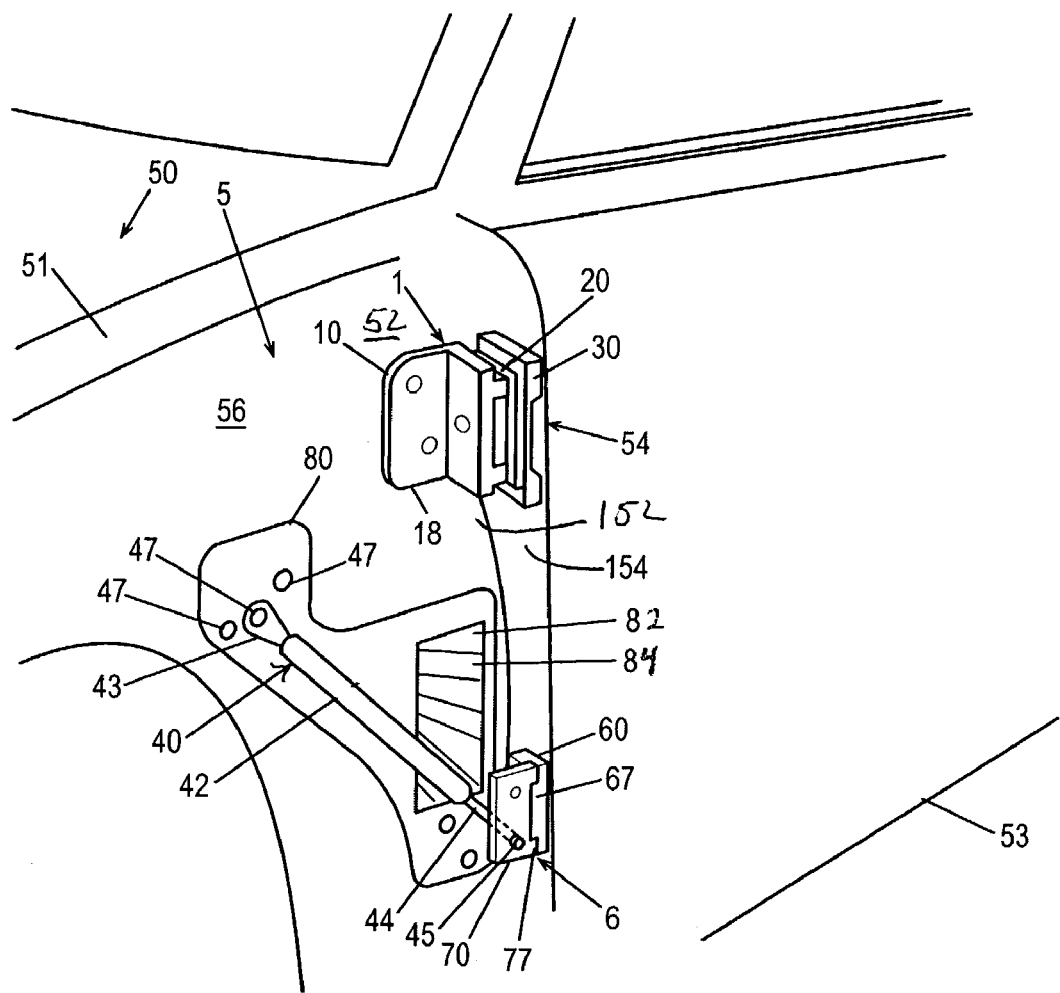
FIGS. 7A and 7B are perspective and side views, respectively, of a vertical-lift door system, in accordance with the present invention.
Figure 7B:
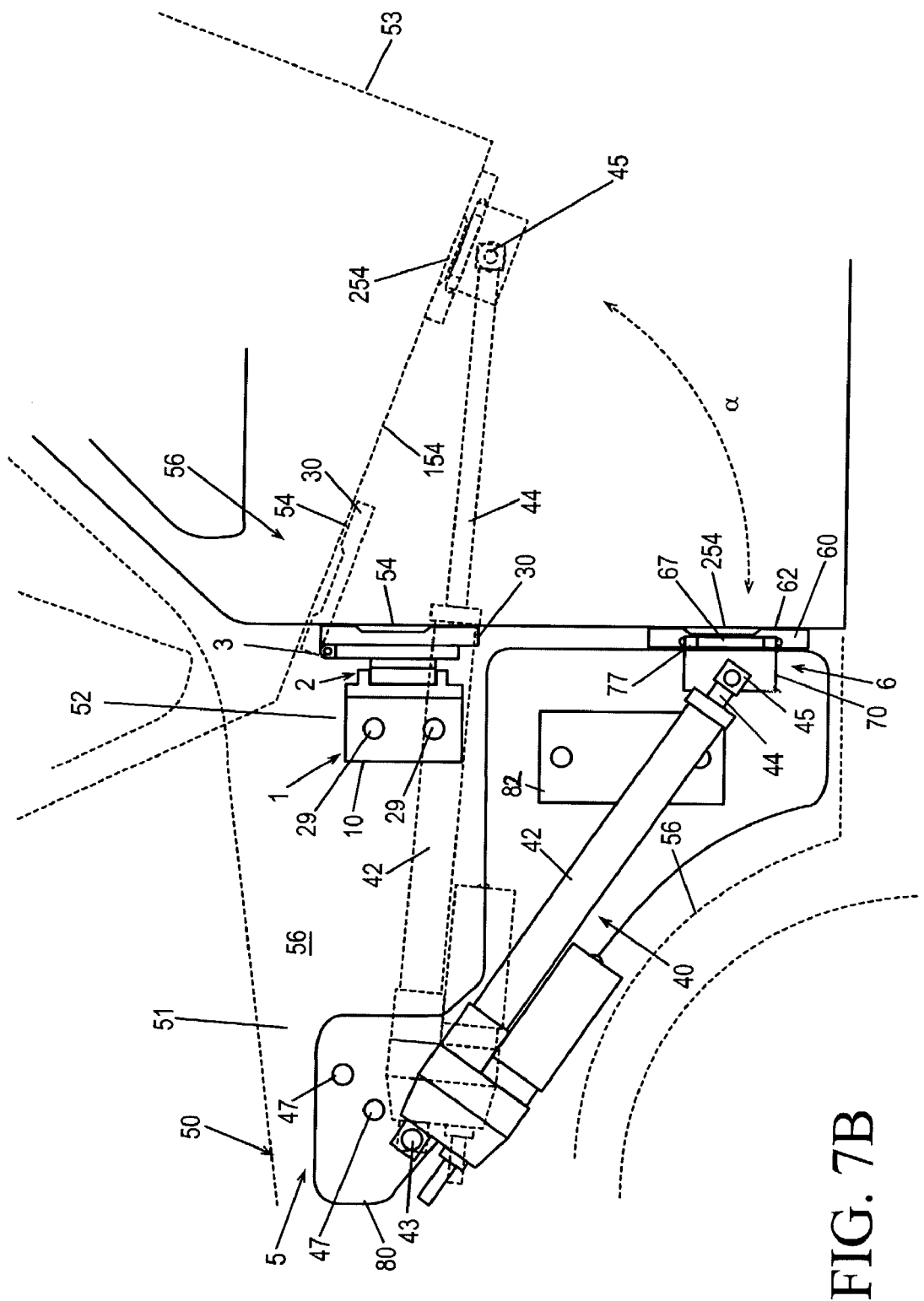

FIGS. 7A and 7B are perspective and side views, respectively, of a multi-axis automobile door mount system 5, in accordance with the present invention. FIG. 7A is a view from the front left corner of the automobile 50; the left side shown with the door 53 in a closed position. FIG. 7B is a view from the left side of the automobile 50; the door 53 shown in phantom in an open position.

Figure 8:
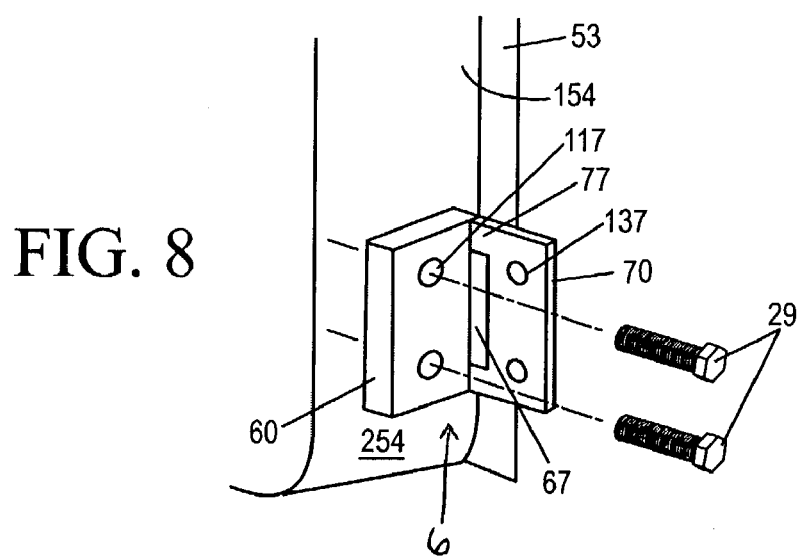
FIG. 8 is a perspective view of an embodiment of a swing hinge in accordance with the present invention.

The multi-axis automobile door mount system 5 comprises a multi-axis automobile door mount 1 as provided in embodiments above, a swing hinge 6, and a linear actuator means 40. The multi-axis automobile door mount 1 is coupled to the hinge mount body surface 52 of the doorjamb 152 and the hinge mount door surface 54 of the door edge 154 as described in embodiments above. The swing hinge 6 is coupled to a swing hinge mount door surface 254 below the multi-axis automobile door mount 1 as shown in FIG. 8. The linear actuator means 40 is coupled at a first end 43 to the automobile body 51, such as, but not limited to, an inner fender surface 56, and at a second end 45 to the swing hinge 6.

FIG. 8 is a perspective view of an embodiment of a swing hinge 6 in accordance with the present invention. The swing hinge 6 is adapted to provide substantially horizontal rotation of the door 53 about a vertical axis of rotation to permit the door 53 to operate in a conventional swing-out manner. The swing hinge 2 of the multi-axis automobile door mount 1 and the swing hinge 6 are adapted for complementary in operation for providing the swing-out rotation of the door 53. The swing hinge 6 comprises a pivotally joined first swing leaf 60 and second swing leaf 70. The first swing leaf 60 is coupled to a swing hinge mount door surface 254, such as the door edge 154 with a suitable coupling means, such as, but not limited to, welding, brazing, and mechanical fastening, such as with bolts 29 (not shown). The second swing leaf 70 is coupled as described below.

The linear actuator means 40 is adapted to provide assistance with the operation of the door 53. The assistance provided by the linear actuator means 40 is in the form of, for example, but not limited to, structural support, lift assist, closing resistance, door positioning, and door control. Apparatus that provide the function of the linear actuator means 40 include, but are not limited to, a gas strut, a pneumatic piston, a hydraulic piston, an electrically-driven linear actuator, a spring-loaded telescoping hinge, and an electro-magnetic linear actuator.

As shown in FIGS. 7A and 7B, the linear actuator means 40 comprises a first actuator section 42 and a second actuator section 44, in accordance with an embodiment of the linear actuator means 40 of the present invention. The second actuator section 44 is adapted to linearly translate from within the first actuator section 42. Distal from the second actuator section 44, the first actuator section 42 comprises a first actuator end 43. Distal from the first actuator section 42, the second actuator section 44 comprises the second actuator end 45. The first actuator end 43 is coupled to the body 51 of the automobile 50 at a location on a side of the swing hinge 6 that is opposite the door 53, such as, but not limited to, the inner fender surface 56. The second actuator end 45 is coupled to the second swing leaf 70.

The first and second linear actuator ends 43, 45 are coupled using a coupling means that provides for pivoting in the vertical direction and accounts for misalignment in the lateral direction. Coupling means that provide the necessary pivoting movement are well known in the art and include, but are not limited to, ball stud mounts and universal joints.

The coupling location of the first linear actuator end 43 to the inner fender surface 56 is determined by the operational characteristics of the particular linear actuator means 40 and the degree of leverage required for a particular purpose. In the embodiment shown in FIGS. 7A and 7B, the linear actuator first end 43 is coupled to the inner fender surface 56 forward and substantially equidistant from the multi-axis automobile door mount 1 and the swing hinge 6. The specific location on the inner fender surface 56 used to couple with the linear actuator first end 43 will depend on parameters of the specific door 53, such as, but not limited to, size and weight, and the desired operating characteristics.

The linear actuator means 40 is adapted to provide assistance with the operation of the door 53 in accordance with a particular purpose. In an embodiment in accordance with the present invention, as shown in FIG. 7A, the linear actuator means 40 is a spring-loaded telescoping actuator that is biased in the extended position of the second actuator section 44 with respect to the first actuator section 42. The linear actuator means 40 provides a vertical-lift bias to the door 53, assisting in the lifting of the door 53 and preventing the door 53 from dropping from the lifted position. The bias is overcome when the door 53 is forcefully brought down from the lifted position and swung closed.

In another embodiment in accordance with the present invention, the linear actuator means 40 is a gas-filled strut that resists movement from a stationary position, such that the strut is biased to remain in the extended position when the door 53 is positioned in the fully vertical lifted position, and remains in the contracted position when the door 53 is in the fully lowered position.

In another embodiment in accordance with the present invention, the linear actuator means 40 is frictionally biased to provide resistance to movement to support the door 53 such that the door 53 remains stationary when released in any vertical position throughout its range of motion.

In yet another embodiment in accordance with the present invention as show in FIG. 7B, the linear actuator means 40 is an electrically-driven linear actuator that is adapted to be activated to vertically lift the door 53 when swung open and activated to vertically lower the door 53 when the door 53 is commanded to be closed.

In another embodiment of a vertical-lift door system (not shown) in accordance with the present invention, a second swing hinge 6 and a second linear actuator means 40 are provided. Two linear actuator means 40 provide, among other things, the benefit of structural support and stability afforded by three-point door attachment. A two linear actuator means vertical-lift door system provides more parameters for, such as, but not limited to, adjusting the opening characteristics of the door 53 to suit a particular purpose.

In another embodiment of a vertical-lift door system in accordance with the present invention, the vertical-lift door system 5 provided above further comprises a bracket 80, as shown in FIGS. 7A and 7B. The bracket 80 is adapted to provide, among other things, reinforcement to the inner fender surface 56 to accommodate the coupling of the first actuator end 43. The bracket 80 is coupled to the inner fender surface 56 using any suitable means, such as, but not limited to, welding, brazing and mechanical fastening.

In an embodiment in accordance with the present invention, the bracket 80 is provided with a suitable bolt hole 47 in a predetermined location by the assembler or consumer. The suitable bolt hole 47 is provided for the coupling of the first actuator end 43 to the bracket 80. The location of the bolt hole 47 is adapted to provide a desired vertical operating characteristics of the door 53 as discussed above.

In another embodiment in accordance with the present invention, the bracket 80 is provided with a plurality of bolt holes 47 in predetermined locations to assist in the coupling of the first actuator end 43 to the bracket 80. The plurality of bolt holes 47 are adapted to provide the assembler or consumer a suitable selection of mounting positions of the actuator first end 43 to provide a desired vertical operating characteristics of the door 53.

In other embodiments of a vertical-lift door system in accordance with the present invention, the vertical-lift door system 5 provided above further comprises a vertical control means for controlling the vertical-lift operation of the door 53. In one embodiment in accordance with the present invention, the passive vertical control means is a rub plate 82, as shown in FIGS. 7A and 7B. The rub plate 82 is coupled to the bracket 80 positioned between the bracket 80 and the linear actuator means 40. The thickness of the rub plate 82 is adapted to engage the linear actuator means 40 throughout at least a portion of the pivotal range of motion of the linear actuator means 40 about the actuator first end 43.

In an embodiment in accordance with the present invention, the engagement between the rub plate 82 and the linear actuator means 40 is frictional engagement. The vertical movement of the door 53 is controlled by the specific degree of frictional engagement between the rub plate 82 and the linear actuator means 40. In another embodiment, the friction provides sufficient resistance against the linear actuator 40 so as to hold the door 53 in a desired vertical-lift position. In another embodiment, the rub plate 82 provides little or no resistance against the linear actuator 40 so as to simply guide the linear actuator 40, and thus the vertical motion of the door 53, within a plane that is substantially coplanar with the surface of the rub plate 82.

In another embodiment in accordance with the present invention, the rub plate 82 comprises a series of grooves 84 adapted to accept at least a portion of the linear actuator means 40 therein, as shown in FIG. 7A. The grooves 84 engage and hold the linear actuator means 40, providing predetermined locations along the range of pivotal motion of the linear actuator means 40 wherein the door 53 is held at a desired vertical position.

In another embodiment in accordance with the present invention, one of the grooves 84 is adapted to provide a stop for the linear actuator means 40 that demarcates a lower position to provide proper vertical alignment with the door-jamb 152 when the door 53 is in the lowered position. In one embodiment, the groove 82 is adjusted in location to provide a desired stand-off distance of the door 53 with the door jamb 152, such that an outer surface of the door 53 is positioned flush with an adjacent surface of the automobile body 51.

In one embodiment in accordance with the present invention, the rub plate 82 comprises a material that permits the assembler or consumer to sculpt or form the surface of the rub plate 82 to suit a particular purpose. In an embodiment in accordance with the present invention, the surface of the rub plate 82 is adapted to be sculpted to provide a groove or step for custom alignment for the door 53 as discussed above, as well as custom vertical positioning of the door 53. Suitable materials for the rub plate 82 include, but are not limited to, urethane and nylon.

Embodiments of the multi-axis automobile door mount 1 and the vertical-lift door system 5 in accordance with the present invention provide the operation of the door 53 to initially swing-out to a predetermined angle α and rotate vertically upwards a predetermined angle β. The initial swing-out of the door 53 provides a number of advantages, including, but not limited to, retention of the initial opening and final closing operating characteristics of the conventional swing-out door enabling retention of the original door latching mechanism and the door sealing and weather stripping. The initial swing-out operation provides that all door structures will clear the automobile body 51 as the door 53 is vertically lifted. This permits the incorporation of vertical-lift door operation for automobiles 50 with doors 53 that have structures that would otherwise collide with the automobile body 51 if the door 53 was opened in a purely vertical operation.

Embodiments of the multi-axis automobile door mount 1 and the vertical-lift door system 5 in accordance with the present invention provide the ability to make available vertical-lift door operation not only to automobile manufacturers, but also to the automobile enthusiast who desires to convert a stock automobile from swing-out door operation to vertical-lift operation with a minimum amount of modification to the automobile.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A multi-axis automobile door mount comprising:

a swing hinge adapted to facilitate pivotal motion of an automobile door about a substantially vertical axis of rotation; and a lift hinge adapted to facilitate pivotal motion of the automobile door about a substantially horizontal axis of rotation, the swing hinge comprises a first leaf and a second leaf pivotally coupled to the first leaf about a substantially vertical axis of rotation, the second hinge comprises the second leaf and a third leaf pivotally coupled to the second leaf about a substantially horizontal axis of rotation, the first leaf comprises a first leaf first end and an opposite first leaf second end, a first leaf first side and an opposite first leaf second side, a first leaf first edge and an opposite first leaf second edge, at least two spaced apart first swing knuckles extending from the first leaf second side adjacent the first leaf second edge, the first swing knuckles defining a swing notch there between, the first swing knuckles each having a first bore there through, the first bores being substantially coaxial and extend substantially parallel with the first leaf second edge;

the second leaf comprising a second leaf first end and an opposite second leaf second end, a second leaf first side and an opposite second leaf second side, a second leaf first edge and an opposite second leaf second edge, at least one second swing knuckle extending from the second leaf first side and adjacent to the second leaf second edge, the second swing knuckle having a second bore there through extending substantially parallel with the second leaf second edge, the at least one of the at least one second swing knuckles adapted to be positioned within the swing notch with the first and second bores in substantially coaxial alignment;

the second leaf further comprising at least two spaced apart first lift knuckles extending from the second leaf first end and defining a lift notch there between, each first lift knuckles having a third bore there through, the third bores in substantially coaxial alignment and substantially parallel with the second leaf first end;

the third leaf comprising a third leaf first end and an opposite third leaf second end, a third leaf first side and an opposite third leaf second side, a third leaf first edge and an opposite third leaf second edge, at least one second lift knuckle extending from the third leaf first side adjacent the third leaf first end, the second lift knuckle having a fourth bore there through, the fourth bore extending substantially parallel with the third leaf first end, the second lift knuckle adapted to be coaxially positioned within the lift notch, the third and forth bores in substantially coaxial alignment;

the multi-axis automobile door mount further comprising a lift hinge pin and a swing hinge pin, the first and second bores adapted to accept the swing hinge pin there through, the swing hinge pin adapted to couple together the first and, second leaves; and the third and fourth bores adapted to accept the lift hinge pin there through, the lift hinge pin adapted to couple together the second and third leaves a lift hinge locking means adapted to prevent movement of the third leaf about the lift hinge unless the second leaf is at a predetermined angle to the first leaf.

2. The multi-axial automobile door mount of claim 1, wherein:
the first leaf is adapted to couple with an automobile doorjamb and the third leaf is adapted to couple with the automobile door, wherein the automobile door is free to move in a substantially vertical plane about the lift hinge subsequent to the automobile door moving in a substantially horizontal plane the predetermined angle about the swing hinge.

3. The multi-axial automobile door mount of claim 2, wherein the lift hinge locking means comprises:
a lift hinge locking pin extending a predetermined distance from the first leaf second side;
a second leaf key slot extending a predetermined distance from the second leaf first edge; and
a third leaf key slot extending a predetermined distance from the third leaf first edge, the lift hinge locking pin adapted to extend from the first leaf second side and through the first and second leaf key slots unless the second leaf is at a predetermined angle to the first leaf.

4. The multi-axial automobile door mount of claim 2, wherein the lift hinge locking means comprises:
a threaded bore extending from the first leaf first side to the first leaf second side;
a lift hinge locking bolt threadably engaged with the threaded bore and adapted to adjustably extend a predetermined distance from the first leaf second side;
a second leaf key slot extending a predetermined distance from the second leaf first edge; and a third leaf key slot extending a predetermined distance from the third leaf first edge, the lift hinge locking bolt adapted to extend from the first leaf second side and through the first and second leaf key slots when the second leaf is at a predetermined angle to the first leaf.

5. The multi-axial automobile door mount of claim 2, wherein the second leaf further comprises a lift angle adjustment means adapted to define a predetermined minimum angle between the second leaf and the third leaf about the lift hinge.

6. The multi-axial automobile door mount of claim 5, wherein the lift angle adjustment means comprises:
a first threaded set screw bore extending into the second leaf second side; and
a first set screw threadably engaged with the threaded set screw bore and adapted to adjustably extend a predetermined distance out from the first leaf second side.

7. The multi-axial automobile door mount of claim 5, wherein the second leaf further comprises a swing angle adjustment means adapted to define a predetermined maximum swing angle between the first leaf and the second leaf about the swing hinge.

8. The multi-axial automobile door mount of claim 7, wherein the swing angle adjustment means comprises:
a second threaded set screw bore extending into the second leaf second side; and
a second set screw threadably engaged with the second threaded set screw bore and adapted to adjustably extend a predetermined distance out from the first leaf second side.

9. The multi-axial automobile door mount of claim 2, wherein the second leaf further comprises a swing angle adjustment means adapted to define a predetermined maximum swing angle between the first leaf and the second leaf about the swing hinge.

10. The multi-axial automobile door mount of claim 9, wherein the swing angle adjustment means comprises:
a second threaded set screw bore extending into the second leaf second side; and
a second set screw threadably engaged with the second threaded set screw bore and adapted to adjustably extend a predetermined distance out from the first leaf second side.

11. The multi-axial automobile door mount of claim 2, wherein the third leaf further comprises a lift angle adjustment means adapted to define a predetermined minimum lift angle between the second leaf and the third leaf about the lift hinge.

12. The multi-axial automobile door mount of claim 11, wherein the lift angle adjustment means comprises:
a third threaded set screw bore extending into the third leaf first side; and
a third set screw threadably engaged with the third threaded set screw bore and adapted to adjustably extend a predetermined distance out from the third leaf first side.

13. The multi-axial automobile door mount of claim 2, wherein the first leaf further comprises a coupling portion extending a predetermined distance from the first leaf first side adjacent the first leaf first edge, the coupling portion adapted to couple with an automobile.

14. A multi-axis automobile door system for coupling an automobile door to an automobile body, comprising:
a multi-axis automobile door mount including a first swing hinge and a lift hinge;
a second swing hinge; and
the first swing hinge including a first leaf and a second leaf, the second leaf pivotally coupled to the first leaf about a first substantially vertical axis of rotation, the first leaf adapted for coupling to the automobile body,
the first leaf comprising a first leaf first end and an opposite first leaf second end, a first leaf first side and an opposite first leaf second side, a first leaf first edge and an opposite first leaf second edge, at least two spaced apart first swing knuckles extending from the first leaf second side adjacent the first leaf second edge, the first swing knuckles defining a swing notch there between, the first swing knuckles each having a first bore there through, the first bores being substantially coaxial and extend substantially parallel with the first leaf second edge;
the second leaf comprising a second leaf first end and an opposite second leaf second end, a second leaf first side and an opposite second leaf second side, a second leaf first edge and an opposite second leaf second edge, at least one second swing knuckle extending from the second leaf first side and adjacent to the second leaf second edge, the second swing knuckle having a second bore there through extending substantially parallel with the second leaf second edge, the at least one of the at least one second swing knuckles adapted to be positioned within the swing notch with the first and second bores in substantially coaxial alignment;
the second leaf further comprising at least two spaced apart first lift knuckles extending from the second leaf first end and defining a lift notch there between, each first lift knuckles having a third bore there through, the third bores in substantially coaxial alignment and substantially parallel with the second leaf first end;
the lift hinge including the second leaf and a third leaf pivotally coupled about a substantially horizontal axis of rotation to the second leaf, the third leaf adapted for coupling to the automobile door, the third leaf comprising a third leaf first end and an opposite third leaf second end, a third leaf first side and an opposite third leaf second side, a third leaf first edge and an opposite third leaf second edge, at least one second lift knuckle extending from the third leaf first side adjacent the third leaf first end, each second lift knuckle having a fourth bore there through, the fourth bore extending substantially parallel with the third leaf first end, each second lift knuckle adapted to be coaxially positioned within the lift notch, the third and forth bores in substantially coaxial alignment;

the multi-axis automobile door mount further comprising a lift hinge pin and a swing hinge pin, the first and second bores adapted to accept the swing hinge pin there through, the swing hinge pin adapted to couple together the first and second leaves; and the third and fourth bores adapted to accept the lift hinge pin there through, the lift hinge pin adapted to couple together the second and third leaves;

the second swing hinge comprising a first swing leaf and a second swing leaf pivotally coupled therewith defining a second substantially vertical axis of rotation, the first swing leaf adapted to couple to the automobile door such that the second substantially vertical axis of rotation is coaxial with the first substantially vertical axis of rotation of the first swing hinge; and a linear actuator comprising an actuator first end and an actuator second end, the actuator first end adapted to couple with the automobile body, and the actuator second end coupled with the second swing leaf, the second swing hinge adapted to pivotally couple the linear actuator and the automobile door about the second substantially vertical axis of rotation at a location below the multi-axis automobile door mount.

15. The multi-axis automobile door system of claim 14, wherein the first leaf is adapted to couple with an automobile doorjamb and the third leaf is adapted to couple with the automobile door, wherein the automobile door is free to move in a substantially vertical plane about the lift hinge subsequent to the automobile door moving in a substantially horizontal plane a predetermined angle about the first and second swing hinges.

16. The multi-axis automobile door system of claim 15, further comprising a lift hinge locking means adapted to prevent movement of the third leaf about the lift hinge unless the second leaf is at a predetermined angle to the first leaf.

17. The multi-axis automobile door system of claim 16, wherein the lift hinge locking means comprises:
a lift hinge locking pin extending a predetermined distance from the first leaf second side;
a second leaf key slot extending a predetermined distance from the second leaf first edge; and
a third leaf key slot extending a predetermined distance from the third leaf first edge, the lift hinge locking pin adapted to extend from the first leaf second side and through the first and second leaf key slots unless the second leaf is at a predetermined angle to the first leaf.

18. The multi-axis automobile door system of claim 16, wherein the lift hinge locking means comprises:
a threaded bore extending from the first leaf first side to the first leaf second side;
a lift hinge locking bolt threadably engaged with the threaded bore and adapted to adjustably extend a predetermined distance from the first leaf second side;
a second leaf key slot extending a predetermined distance from the second leaf first edge; and a third leaf key slot extending a predetermined distance from the third leaf first edge, the lift hinge locking bolt adapted to extend from the first leaf second side and through the first and second leaf key slots when the second leaf is at a predetermined angle to the first leaf.

19. The multi-axis automobile door system of claim 18, wherein the second leaf further comprises a swing angle adjustment means adapted to define a predetermined maximum swing angle between the first leaf and the second leaf about the swing hinge.

20. The multi-axis automobile door system of claim 19, wherein the swing angle adjustment means comprises:
a second threaded set screw bore extending into the second leaf second side; and
a second set screw threadably engaged with the second threaded set screw bore and adapted to adjustably extend a predetermined distance out from the first leaf second side.

21. The multi-axis automobile door system of claim 16, wherein the second leaf further comprises a lift angle adjustment means adapted to define a predetermined minimum lift angle between the second leaf and the third leaf about the lift hinge.

22. The multi-axis automobile door system of claim 21, wherein the lift angle adjustment means comprises:
a first threaded set screw bore extending into the second leaf second side; and
a first set screw threadably engaged with the threaded set screw bore and adapted to adjustably extend a predetermined distance out from the first leaf second side.

23. The multi-axis automobile door system of claim 16, wherein the second leaf further comprises a swing angle adjustment means adapted to define a predetermined maximum swing angle between the first leaf and the second leaf about the swing hinge.

24. The multi-axis automobile door system of claim 23, wherein the swing angle adjustment means comprises:
a second threaded set screw bore extending into the second leaf second side; and
a second set screw threadably engaged with the second threaded set screw bore and adapted to adjustably extend a predetermined distance out from the first leaf second side.

25. The multi-axis automobile door system of claim 16, wherein the third leaf further comprises a lift angle adjustment means adapted to define a predetermined minimum lift angle between the second leaf and the third leaf about the lift hinge.

26. The multi-axis automobile door system of claim 25, wherein the lift angle adjustment means comprises:
a third threaded set screw bore extending into the third leaf first side; and a third set screw threadably engaged with the third threaded set screw bore and adapted to adjustably extend a predetermined distance out from the third leaf first side.

27. The multi-axis automobile door system of claim 16, wherein the first leaf further comprises a coupling portion extending a predetermined distance from the first leaf first side adjacent the first leaf first edge, the coupling portion adapted to couple with the automobile.

28. The multi-axis automobile door system of claim 14, further comprising a bracket, the bracket adapted to couple with the automobile body and the actuator first end.

29. The multi-axis automobile door system of claim 28, the bracket further comprising a vertical control means adapted to control the vertical-lift operation of the door.

30. The multi-axis automobile door system of claim 29, wherein the vertical control means is a rub plate, the rub plate coupled to the bracket positioned between the bracket and the linear actuator means, a surface of the rub plate adapted to engage the linear actuator means throughout at least a portion of a pivotal range of motion of the linear actuator means about the actuator first end, the engagement adapted to control the vertical lifting of the door.

31. The multi-axis automobile door system of claim 30, where the surface of the rub plate adapted to engage the linear actuator means comprises one or more grooves adapted to engage the linear actuator means.

* * * * *